(12) United States Patent
Thomsen et al.

(10) Patent No.: US 11,248,584 B2
(45) Date of Patent: Feb. 15, 2022

(54) RELATING TO WIND TURBINES HAVING BLADES EQUIPPED WITH BOUNDARY LAYER CONTROL SYSTEM

(71) Applicant: VESTAS WIND SYSTEMS A/S, Aarhus (DK)

(72) Inventors: Jesper Sandberg Thomsen, Hadsten (DK); Ian Couchman, Newport (GB)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 251 days.

(21) Appl. No.: 16/463,811

(22) PCT Filed: Nov. 23, 2017

(86) PCT No.: PCT/DK2017/050387
§ 371 (c)(1),
(2) Date: May 23, 2019

(87) PCT Pub. No.: WO2018/095496
PCT Pub. Date: May 31, 2018

(65) Prior Publication Data
US 2019/0285051 A1   Sep. 19, 2019

(30) Foreign Application Priority Data
Nov. 24, 2016   (DK) .............................. PA201670936

(51) Int. Cl.
*F03D 7/02*   (2006.01)
(52) U.S. Cl.
CPC ............. *F03D 7/024* (2013.01); *F03D 7/022* (2013.01); *F03D 7/0244* (2013.01);
(Continued)
(58) Field of Classification Search
CPC ....... F03D 7/022; F03D 7/0224; F03D 7/0244
See application file for complete search history.

(56) References Cited

U.S. PATENT DOCUMENTS 1,300,552 A * 4/1919 Barr ......................... B64C 11/24
                                                          416/91
6,940,185 B2 * 9/2005 Andersen .................. F03D 7/02
                                                          290/44
(Continued)

FOREIGN PATENT DOCUMENTS

EP   2053240 A1    4/2009
EP   2128385 A2   12/2009
(Continued)

OTHER PUBLICATIONS

Danish Patent and Trademark Office First Technical Examination for Application No. PA 2016 70936 dated Jun. 1, 2017.
(Continued)

*Primary Examiner* — Woody A Lee, Jr.
*Assistant Examiner* — Behnoush Haghighian
(74) *Attorney, Agent, or Firm* — Patterson + Sheridan, LLP

(57) ABSTRACT

A wind turbine system comprising a nacelle mounted on a tower, a rotor having a plurality of blades and a boundary layer control system configured to control airflow through blade surface openings in each of the blades. The wind turbine system includes a control system configured to perform at least one of the following: to monitor an operational speed parameter of the wind turbine, and to activate the boundary layer control system if it is determined that the 1 operational speed parameter exceeds a predetermined speed parameter threshold; to monitor tower motion and to activate the boundary layer control system based on a determination of excessive tower motion; to monitor for a wind turbine shutdown condition, and to activate the boundary layer control system if it is determined that a wind turbine shutdown condition has been identified; and to monitor the aerodynamic loads on the blades, and to activate the boundary layer control system also based on a determi-
(Continued)

nation of excessive blade loads. The system thereby provides an approach to activating and deactivating the boundary layer control system to reduce operational risk to the wind turbine.

8 Claims, 6 Drawing Sheets

(52) U.S. Cl.
CPC ......... *F03D 7/0252* (2013.01); *F03D 7/0264* (2013.01); *F03D 7/0276* (2013.01); *F03D 7/0224* (2013.01); *F05B 2260/901* (2013.01); *F05B 2270/327* (2013.01); *F05B 2270/331* (2013.01); *Y02E 10/72* (2013.01)

(56) References Cited

U.S. PATENT DOCUMENTS

| | | | | |
|---|---|---|---|---|
| 7,387,491 | B2 * | 6/2008 | Saddoughi | F03D 1/0608 416/62 |
| 7,435,057 | B2 * | 10/2008 | Parera | F03D 15/05 416/231 R |
| 8,029,239 | B2 * | 10/2011 | Luetze | F03D 15/05 416/91 |
| 8,267,653 | B2 * | 9/2012 | Nies | F03D 1/0633 416/1 |
| 8,475,129 | B2 * | 7/2013 | Haans | F03D 15/05 416/90 R |
| 8,616,846 | B2 * | 12/2013 | Nanukuttan | F03D 7/022 416/1 |
| 8,807,940 | B2 * | 8/2014 | Grabau | F03D 1/0633 416/90 R |
| 8,816,871 | B2 * | 8/2014 | Drossel | F03D 17/00 340/658 |
| 9,133,819 | B2 * | 9/2015 | Zuteck | F03D 1/0675 |
| 9,347,431 | B2 * | 5/2016 | Esbensen | F03D 7/0204 |
| 9,512,821 | B2 * | 12/2016 | Baruzzini | F03D 7/022 |
| 9,567,978 | B2 * | 2/2017 | Marwaha | F03D 7/024 |
| 9,926,911 | B2 * | 3/2018 | Butterworth | F03D 7/044 |
| 10,385,826 | B2 * | 8/2019 | Butterworth | F03D 7/0252 |
| 2004/0201220 | A1 * | 10/2004 | Andersen | F03D 1/0608 290/44 |
| 2010/0014970 | A1 * | 1/2010 | Bove | F03D 7/0244 416/1 |
| 2010/0076614 | A1 | 3/2010 | Nies et al. | |
| 2010/0104436 | A1 | 4/2010 | Herr et al. | |
| 2010/0143123 | A1 * | 6/2010 | Haans | F03D 80/55 416/1 |
| 2010/0266382 | A1 * | 10/2010 | Campe | F03D 1/0608 415/1 |
| 2011/0010953 | A1 | 1/2011 | Williams | |
| 2011/0018268 | A1 * | 1/2011 | Snel | F03D 7/022 290/44 |
| 2011/0103953 | A1 | 5/2011 | Haans | |
| 2011/0206506 | A1 | 8/2011 | Nies et al. | |
| 2011/0229322 | A1 | 9/2011 | Tadayon et al. | |
| 2012/0020803 | A1 * | 1/2012 | Lees | F03D 15/05 416/233 |
| 2012/0114482 | A1 | 5/2012 | Haans et al. | |
| 2012/0134812 | A1 * | 5/2012 | Nanukuttan | F03D 1/0633 416/1 |
| 2012/0134813 | A1 * | 5/2012 | Nies | F03D 7/024 416/1 |
| 2012/0138412 | A1 | 6/2012 | Rogner | |
| 2012/0139740 | A1 * | 6/2012 | Drossel | F03D 17/00 340/658 |
| 2013/0022464 | A1 | 1/2013 | Dixon et al. | |
| 2016/0076516 | A1 * | 3/2016 | Butterworth | F03D 7/0232 416/1 |
| 2016/0076517 | A1 * | 3/2016 | Butterworth | F03D 17/00 416/1 |
| 2016/0115941 | A1 * | 4/2016 | Marwaha | F03D 17/00 416/1 |

FOREIGN PATENT DOCUMENTS

| | | |
|---|---|---|
| EP | 2320076 A2 | 5/2011 |
| EP | 2497944 A1 | 9/2012 |
| WO | 2008080407 A1 | 7/2008 |
| WO | 2011053119 A1 | 5/2011 |
| WO | 2018095496 A1 | 5/2018 |

OTHER PUBLICATIONS

PCT Written Opinion of the International Searching Authority for Application No. PCT/DK2017/050387.
PCT International Search Report for Application No. PCT/DK2017/050387 dated Feb. 19, 2018.

* cited by examiner

RELATING TO WIND TURBINES HAVING BLADES EQUIPPED WITH BOUNDARY LAYER CONTROL SYSTEM

TECHNICAL FIELD

The present disclosure relates to a wind turbine having blades that are equipped with a boundary layer control system and, more particularly, to a technique for controlling the boundary layer control system in order to achieve operational advantages for that wind turbine.

BACKGROUND

Wind turbine technology is under continual development to increase the power generation capability of wind turbines, but also to maximise their efficiency. Part of that development effort is directed to towards improving the structure of the wind turbine blades, to make them lighter, stronger, and more aerodynamically efficient. However, the control of the blades during operation is also vital to ensure that the maximum amount of energy can be extracted from the wind, yet at the same time controlling the huge forces generated by the blades on their supporting structures, for example their associated rotor shaft, nacelle and wind turbine tower.

To provide control over the torque that is generated by a rotor hub, a wind turbine includes a pitch control system which actuates the blades so that they are able to be pitched about their longitudinal axis, thereby adjusting their angle of attack relative to the oncoming flow of wind and so controlling the lift generated by the blades. In dangerously high wind conditions, particularly above rated wind speed, wind turbine blades may be pitched towards a feathered position in order to significantly reduce the generated torque. For moderately sized blades, this technique works well to reduce torque and also the rotational speed of the wind turbine, and thereby acts as a useful safety measure to protect wind turbines from the potentially dangerous effects of extreme wind conditions. However, basic pitch control techniques are becoming more problematic to integrate with newer, longer, blade designs.

The length of wind turbine blades are increasing in pursuit of higher generation potential, whilst their profiles are becoming more complex, Typically, for example, blades may include a twist along their lengths of around 10-20 degrees, which helps to compensate for the changing apparent wind angle towards the blade tip. However, one downside of such blade twist features is that pitching the blades out of the wind can result in the outer part of the blade being arranged at a negative angle of attack. This can lead to an issue known as 'negative stall', where the airflow separates from the pressure side of the blade and which can be observed as turbulence, noise and instability, particularly edgewise vibrations of the blades which can be damaging.

Efforts have been made to address such issues, one example of which can be appreciated from U.S. Pat. No. 9,133,819 B2 to Kohana Technologies, Inc. This document describes a proposed blade design which includes a boundary layer control system comprising airflow vents that extend along a spanwise mid-portion of the wind turbine blade. Blowing air through the vents disrupts the airflow around the blade, which therefore reduces the generated lift along the corresponding section of the blade. As the lift is reduced around the mid-portion of the blade, this means that the blade pitch angle needs less adjustment in order to achieve a target reduction in overall lift, which, accordingly, means that there is less risk of the tip-ward part of the blade going into negative stall.

Whilst technology demonstrated by U.S. Pat. No. 9,133,819 shows some promise to provide more flexible control over the lift forces produce by wind turbine blades during extreme wind conditions, such systems in practice are non-trivial to integrate into wind turbine control systems. It is against this background that the embodiments of the invention have been devised.

SUMMARY OF THE INVENTION

In a first aspect, the invention provides a wind turbine system comprising a nacelle mounted on a tower, a rotor having a plurality of blades and a boundary layer control system configured to control airflow through blade surface openings in each of the blades. The wind turbine also includes a control system configured to perform at least one of the following:

to monitor an operational speed parameter of the wind turbine rotor, and to activate the boundary layer control system if it is determined that the operational speed parameter exceeds a predetermined speed parameter threshold;
  to monitor tower motion and to activate the boundary layer control system based on a determination of excessive tower motion;
  to monitor for a wind turbine shutdown condition, and to activate the boundary layer control system if it is determined that a wind turbine shutdown condition has been identified; and
  to monitor the aerodynamic loads on the blades, and to activate the boundary layer control system also based on a determination of excessive blade loads
  wherein the control system monitors the operational speed parameter and monitors tower motion, and wherein the control system is configured to activate the boundary layer control system based on a determination that the predetermined operational speed parameter threshold has been exceeded and that the tower motion is excessive.

The embodiments of the invention also extend to a method of operating a wind turbine, the wind turbine including a nacelle mounted on a tower, a rotor having a plurality of blades and a boundary layer control system configured to control airflow through blade surface openings in each of the blades, wherein the method comprises at least one of:

monitoring an operational speed parameter of the wind turbine rotor, and activating the boundary layer control system if it is determined that the operational speed parameter exceeds a predetermined speed parameter threshold;
  monitoring tower motion, and activating the boundary layer control system also based on a determination of excessive tower motion;
  monitoring for a wind turbine shutdown condition, and activating the boundary layer control system if it is determined that a wind turbine shutdown condition has been identified; and,
  monitoring the aerodynamic loads on the blades, and activating the boundary layer control system also based on a determination of excessive blade loads
  wherein the method further comprises monitoring the operational speed parameter and monitoring tower motion, and activating the boundary layer control system based on a determination that the predetermined operational speed parameter threshold has been exceeded and that the tower motion is excessive.

Aspects of the invention also relate to a controller configured to perform the procedural actions defined above, and a computer program product downloadable from a communication network and/or stored on a machine readable medium, comprising program code instructions for implementing the procedural actions defined above.

A benefit of the invention is that it reduces the operational risk of the wind turbine in extreme wind conditions since the system provides a robust approach to detect such conditions and activate the boundary layer control system to guard against damage to the wind turbine. It also provides a means to reduce the activity of an associated pitch control system, thereby reducing the mechanical degradation of such a system.

In monitoring the operational speed of the wind turbine rotor, the speed parameter threshold may be set at a value below 120% of the rated operational speed. For example, the threshold may be between about 105% to about 115%. The precise level of the threshold may be determined in dependence on how sensitive the activation of the system needs to be. In general, a threshold at the lower end of this range will result in a more sensitive system that activates the boundary layer control system at relatively low excursions beyond the rated operational speed.

The system monitors tower motion in addition to monitoring operational speed in order to determine whether the boundary layer control system should be activated. Here, the system may be operable to determine the direction of motion of the tower, such that the control system may vary the speed parameter threshold in dependence on the direction of tower motion. For example, the operational speed parameter threshold may be increased if the control system determines that the tower motion is in a rearwards direction and, conversely, the operational speed parameter threshold may be reduced if the control system determines that the tower motion is in a forward direction.

If simply monitoring tower motion, for example a tower acceleration signal, suitable statistical processing can be performed on that signal in order to provide a tower motion value that is appropriate for comparison to acceptable levels of tower motion. Excursions beyond the acceptable levels will therefore trigger activation of the boundary layer control system. One example is that the standard deviation of the tower acceleration signal may be determined.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

The invention will now be described in detail, by way of example only, with reference to the accompanying drawings, in which.

DETAILED DESCRIPTION

Specific embodiments of the invention will now be described in which numerous features will be discussed in detail in order to provide a thorough understanding of the inventive concept as defined in the claims. However, it will be apparent to the skilled person that the invention may be put in to effect without the specific details and that in some instances, well known methods, techniques and structures have not been described in detail in order not to obscure the invention unnecessarily.

Figure 1:
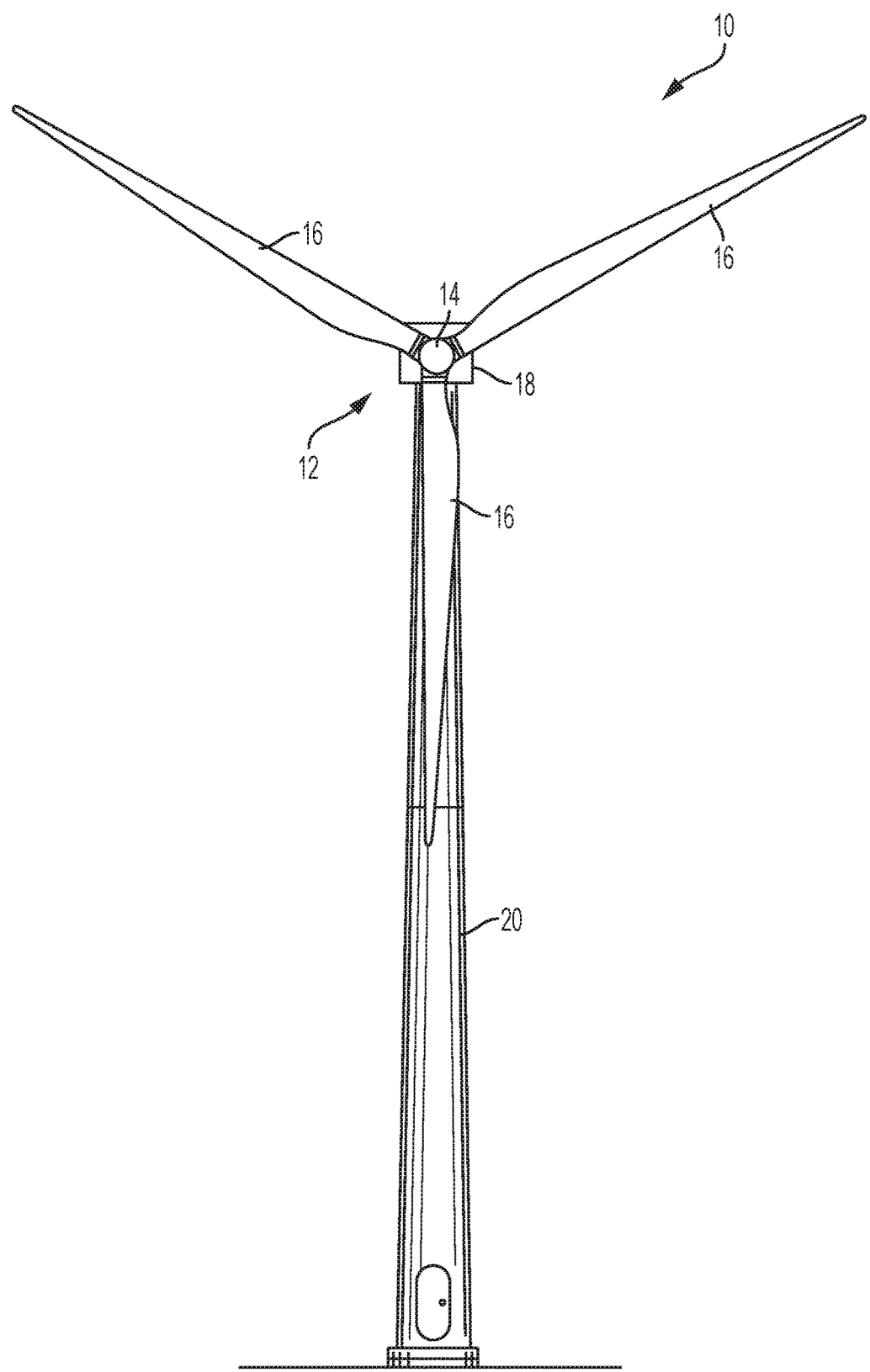
FIG. 1 is a front view of a wind turbine within which the embodiments of the invention may be incorporated.

In order to place the embodiments of the invention in a suitable context, reference will firstly be made to FIG. 1. In FIG. 1, a wind turbine 10 according to one embodiment of the invention comprises a rotor 12 including a hub 14 to which is attached three wind turbine blades 16. The rotor 12 is rotatably supported by a nacelle 18 that is mounted to the top of a tower 20 in the usual way. The nacelle 18 houses and supports various power generating components of the wind turbine 10, as will be described. As is known, the flow of wind acting on the blades 16 spins the rotor 10 which drives the power generation equipment housed in the nacelle 18. The power generation equipment is shown in more detail in FIG. 2.

The wind turbine 10 illustrated in FIG. 1 is an onshore wind turbine, although the invention may equally be applied to an offshore wind turbine. Here, the wind turbine is a horizontal axis type (HAWT), which is a common type of system, although other types exist to which the invention is also applicable.

Figure 2:
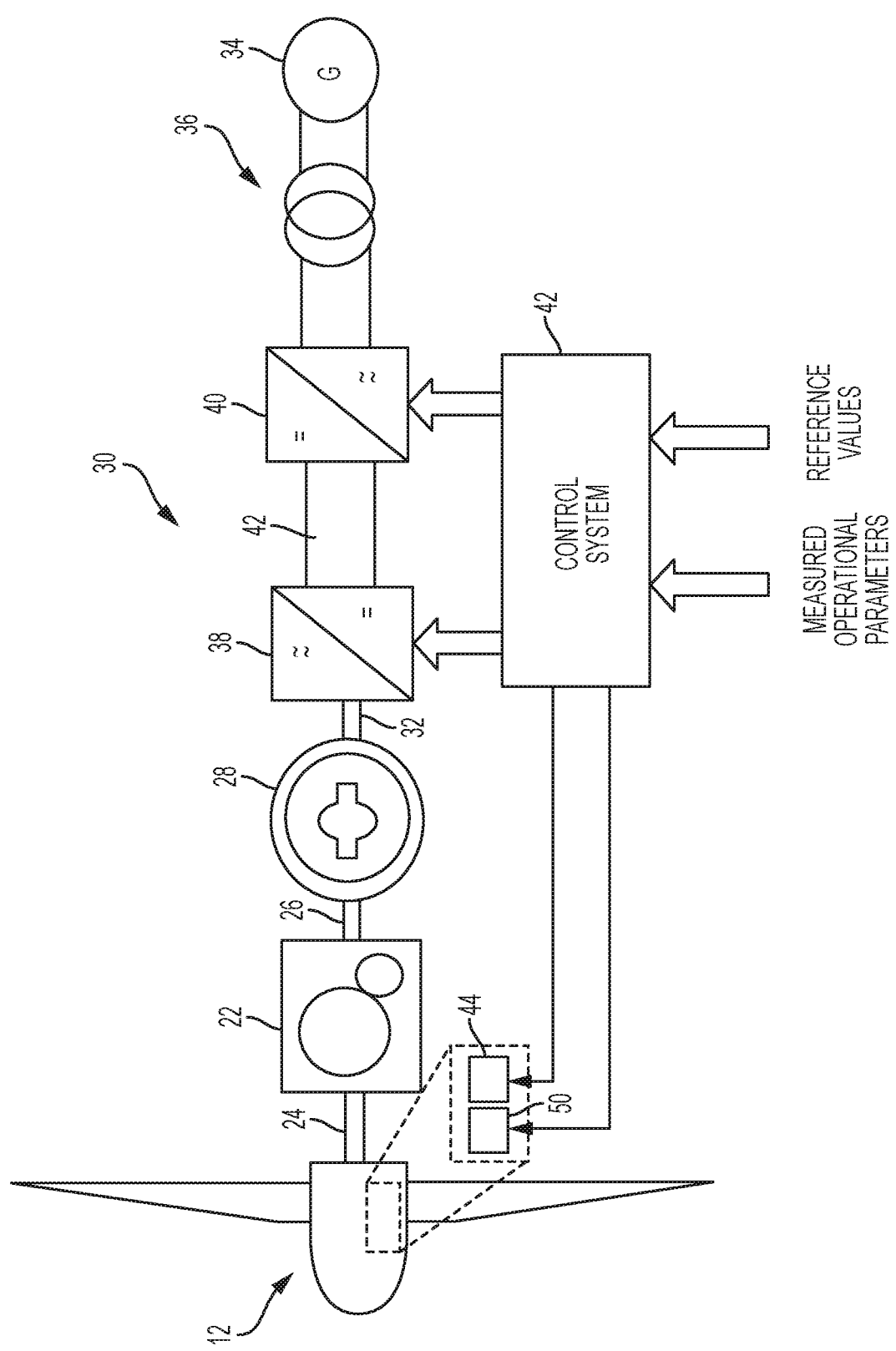
FIG. 2 is a typical power curve of a wind turbine that illustrates different operating regions.

FIG. 2 illustrates an example of a power generation system architecture which gives context to the invention, as will become apparent. Represented schematically as a system diagram, the wind turbine 'system' includes features that are significant for this discussion, but it should be appreciated that many other conventional features are not shown here for brevity, for example yaw control equipment, control network, local power distribution network and so on. However, the skilled person would understand that these features would be present in a practical implementation, and so their presence is implied. Also it should be noted that the specific architecture discussed here is used as an example to illustrate the technical functionality of the invention, and so the invention may be implemented by a system having a different specific architecture.

Returning to the figure, the rotor 12 drives a transmission 22 by way of an input drive shaft 24. Although the transmission 22 is shown here in the form of a gearbox, it is also known for wind turbines to have direct-drive architectures which do not include a gearbox. The transmission 22 has an output shaft 26 which drives a generator 28 for generating electrical power. Three phase electrical power generation is usual in utility scale wind turbine systems, but this is not essential for the purpose of this discussion.

The generator 28 is connected to a frequency converter 30 by a suitable three-phase electrical connector such as a cable or bus 32. The frequency converter 30 is of conventional architecture and, as is known, converts the output frequency of the generator 28 to a voltage level and frequency that is suitable for supplying to an electrical grid 34 via a transformer 36. It will be appreciated that the specific architecture described here is a two-level back-to-back full-scale power converter (FSC) system, which includes a generator-side converter 38 and a grid side converter 40 which are coupled via a DC link 42. The general architecture of such a system is conventional and will not be described in more detail. Furthermore, the skilled person will understand that other architectures are known, such as doubly-fed induction generator-based systems (DFIG).

The wind turbine also comprises a control system 42. In general, the functionality of a wind turbine control system is well known in the art, but a brief discussion is provided here to provide a functional overview and suitable context to the invention.

In overview the role of the control system 42 is to monitor the operational state of the wind turbine and to optimise the production and delivery of electrical power to the grid, whilst avoiding operational conditions that may pose a risk to the structural and functional integrity of the wind turbine. Broadly, the control system 42 receives a set of measured operational parameters, such as wind information (speed, shear, direction), rotor speed, generator speed and so on, and a set of reference values, which may include a torque reference, a power reference, and a speed reference. In response to the measured operational parameters and the reference values, the control system 42 controls the power converter 30 and a pitch control system 44 in order to deliver the generated active and reactive power levels that are required of the wind turbine by a higher level control entity, for example a grid operator or a power plant controller, if the wind turbine forms part of a power plant. As is known to the skilled person, a pitch control system 44 is a common feature in a wind turbine system and acts to control the angle of attack of the blades relative to the wind and thereby regulating the torque generated by the rotor on the generator at a wide range of rotor speeds. Since the operation of a pitch control system is so well known, a detailed explanation will not be provided here.

Figure 3:
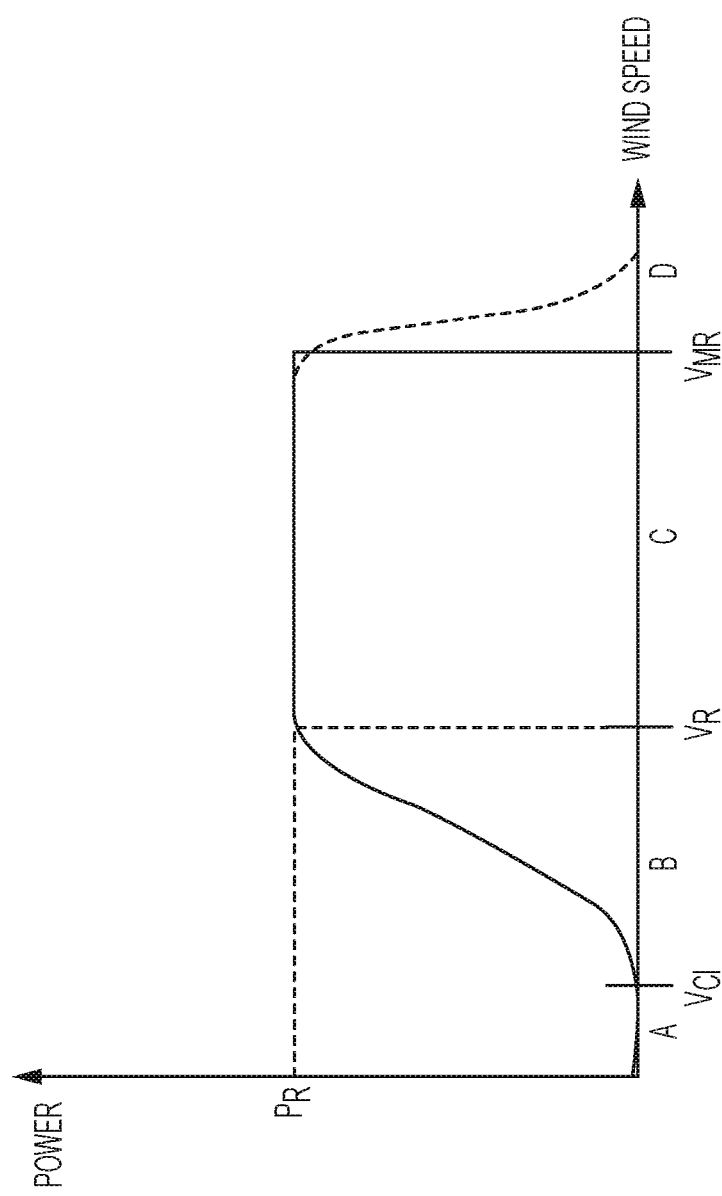
FIG. 3 is a systems view of the wind turbine in FIG. 1, which illustrates an example of a suitable power generation and control architecture suitable for the embodiments of the invention.

A brief discussion of a typical wind turbine control strategy will now be provided by way of example and by way of further background. As is known, variable-speed wind turbines typically operate under two main control strategies: below-rated power and above-rated power; these strategies are often expressed by way of a power curve, as shown in FIG. 3, which partitions the operation of the wind turbine generator into a number of regions. The term 'rated power' is used here in its accepted sense to mean the power output at which the wind turbine system is rated or certified to produce under continuous operation. Similarly, the use of the term 'rated wind speed' should be understood to mean the lowest wind speed at which the rated power of a wind turbine is produced.

With reference also to FIG. 3, Region A covers operation of the wind turbine where the wind speed is too low to drive the blades to generate power. Region A extends to the 'cut-in' wind speed ($V_{CI}$) at which point the wind flow is energetic enough for the wind turbine generator to be activated in order to start generating power. The operation then moves into region 'B' in which the wind speed is above the cut-in wind speed but is too low for the generator to produce maximum or 'rated power'. Thus, region 'B' may also be known as below-rated operation, which, typically, is between 10 and 17 m/s, but may be different depending on the size of the wind turbine. In this operating region, the control system is operable to control the rotor speed so as to maximise the energy captured from the wind. This is achieved by controlling the rotor speed so that the tip speed ratio is at an optimum value, namely between 6 and 7. To control the rotor speed, the control system 42 controls the generator torque, via the power converter 30, so as to track a power (or torque) reference.

Above-rated power occurs in region 'C', where the wind speed has increased to, or exceeds, the rated wind speed ($V_R$). In this operating condition, the objective of the control system 42 is to maintain a constant output power. This is achieved by controlling the generator torque to be substantially constant, so as to track a constant power reference, but varying the pitch angle of the blades by way of the pitch control system 44 which adjusts the resulting lift and drag force of the blades in the rotor plane. This will control the torque transferred to the rotor shaft so that the rotational speed, and also the generated power of the system, is kept constant below a set threshold.

The use of blade pitch control and generator torque control can maintain rated power for a comparatively wide range of wind speeds. However, a point will be reached ($V_{MR}$) at which the wind speed is too high for continued safe operation of the wind turbine generator at which point power must be curtailed (region 'D') or the wind turbine must be shut down to prevent damage to the generator and other components.

Throughout the operational regions A-D, the control system 42 applies a supervisory control function to monitor the rotor speed to ensure that it does not exceed a predetermined rotor speed threshold. If rotor speed does rise to unacceptable levels, perhaps due to a failure in speed control, the control system 42 can act to shut down the wind turbine to avoid the rotor spinning too fast which may cause excessive wear and damage to certain components of the wind turbine, such as the main rotor bearing and the gearbox. Typically the wind turbine will implement suitable pitch control to disrupt the lift generated by the blade thereby reducing the generated torque and, thus, reducing the rotational speed.

Figure 4:
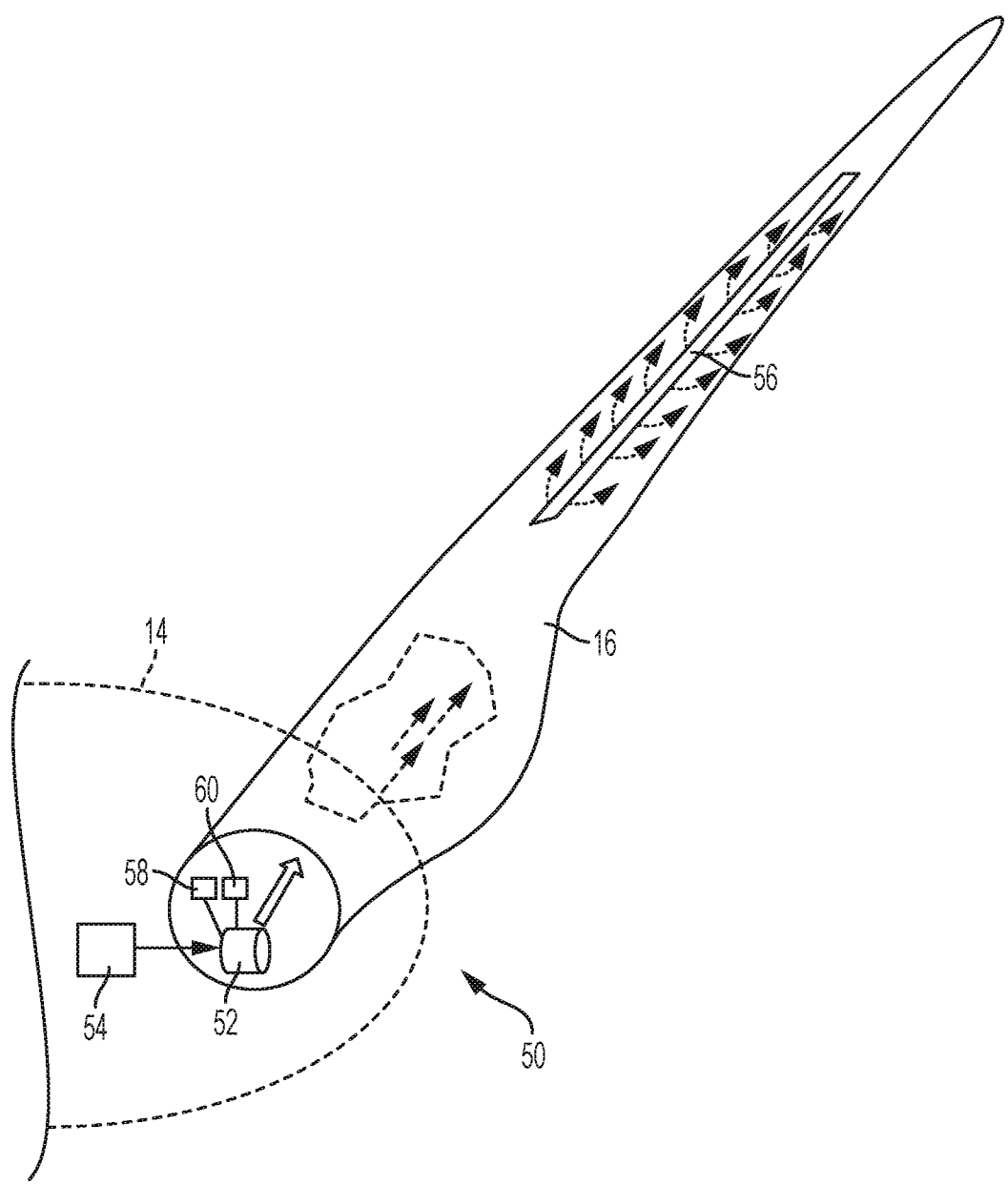
FIG. 4 is a perspective view of one of the blades of the wind turbine in FIG. 1, and provides a schematic representation of a boundary layer control system for that blade.

In the illustrated embodiment of the invention, there is provided a further operational safety system which can be activated during high wind speeds, for example, in order to reduce the operational speed of the wind turbine rotor. This may be used to maintain the wind turbine rotor at a predetermined threshold speed, or may be with the aim of shutting down the wind turbine. Referring initially to FIGS. 2 and 4, the wind turbine 10 includes a boundary layer control system 50. Note that in FIG. 2 the boundary layer control system 50 is illustrated as being contained in the hub 14. However, this is for convenience and it should be noted that some components or functionality may not be located in the hub, for example some functionality may be implemented in the control system 42, as will become clear in this description. The function of the boundary layer control system 50 is to provide a selectively activated airflow passage in the surface of the wind turbine blades; that passage can be in the form of an elongated slot, as shown in FIG. 4, although other configurations such as a series of apertures would also be acceptable. In general, such boundary layer control systems are known in the art. For example, EP2053240B1 and US2013/0022463 describe examples of such systems.

Therefore, the skilled person would readily understand how a wind turbine could incorporate a boundary layer control system into its blades and how such a system could be made to function. The present discussion is therefore concerned with how to control such a system under certain operational conditions in order to achieve distinct advantages.

Although the general structure and functionality of a boundary layer control system is known, a brief discussion will be provided here for completeness. So, referring again to FIGS. 2 and 4, the boundary layer control system 50 comprises controllable valve means 52 that controls the flow of air into the interior volume of a wind turbine blade. The same or similar arrangement would likely be provided on each blade of the wind turbine.

The valve means 52 (hereinafter simply "valve") is configured to receive a control or activation signal from a suitable control module 54. The valve 52 could be any suitable airflow control valve, such an electronically controlled flap valve. In FIG. 4 the control module 54 is shown as a separate functional block, but it should be appreciated that the control module 54 could be implemented as a separate hardware component or, more likely, its functionality may be implemented as part of the hardware and software of the wind turbine control system 42.

The blade 16 includes an airflow passage 56 that extends along the surface of the blade. In the illustrated embodiment it is shown as an elongated slot but other configurations are possible. The purpose of the airflow passage 56 is to allow air to flow through the passage thereby disrupting the boundary layer flow along the blade surface. The airflow may either be outbound, from the interior of the blade to the blade exterior or, alternatively, inbound, from the exterior of the blade to the interior of the blade. The valve means 52 may also be located adjacent to the airflow passage to control the airflow through the passage from a nearby position. Note that the airflow through the passage 56 may be at low or high pressure, and so the valve means may include an air pump 58 for raising the pressure of the air in the blade and thus, what is emitted from the airflow passage. In other embodiments, a suitable plenum or conduits may be provided to convey pressurised air from the valve means to the airflow passage 56. In other embodiments, the valve means may include a vacuum pump 60 to reduce the pressure of air at the airflow passage 56 so as to draw air through the passage into the blade, thus also affecting the boundary layer airflow around the blade. Similarly, the vacuum pump 60 may be arranged to reduce the pressure of air at the airflow passage 56 by reducing the pressure in the bulk interior volume of the blade, or suitable conduits, plenum or pipe work may be provided to direct low pressure regions adjacent the air flow passage 56. Note also that although one air flow passage 56 is shown here, the boundary layer system may include multiple airflow passages as appropriate.

The airflow through the airflow passage 56 is controlled, for example by way of the valve means 52, in accordance with a control strategy that will now be described.

In general, the control module 54 is operable to control activation and deactivation of the boundary layer control system in order to achieve certain safety related functions. This exploits the advantage that the boundary layer control system 50 is able to reduce the sensitivity of the blades to changes in pitch control input; that is, changes in pitch angle as controlled by the pitch control system. Moreover, since disruption of the boundary layer reduces the lift of the blade, the boundary layer control system is able to provide a degree of control over the lift generated by the blade without activating the pitch system. Therefore, this provides the possibility that rotor torque and, thus, rotor speed, are able to be regulated within certain limits without changing the pitch of the blades.

In more detail, the embodiments of the invention provide a control approach in which the boundary layer control system is operable to perform at least one of the following functionalities:

monitor an operational speed parameter of the wind turbine, and to activate the boundary layer control system if it is determined that the operational speed parameter exceeds a predetermined speed parameter threshold;

monitor tower motion and to activate the boundary layer control system also based on a determination of excessive tower motion;

monitor for a wind turbine shutdown condition, and to activate the boundary layer control system if it is determined that a wind turbine shutdown condition has been identified;

monitor the aerodynamic loads on the blades, and to activate the boundary layer control system also based on a determination of excessive blade loads.

In particular, an embodiment of the invention provides a control approach in which the boundary layer control system monitors the operational speed parameter and monitors tower motion, and the control system is configured to activate the boundary layer control system based on a determination that the predetermined operational speed parameter threshold has been exceeded and that the tower motion is excessive.

Figure 5:
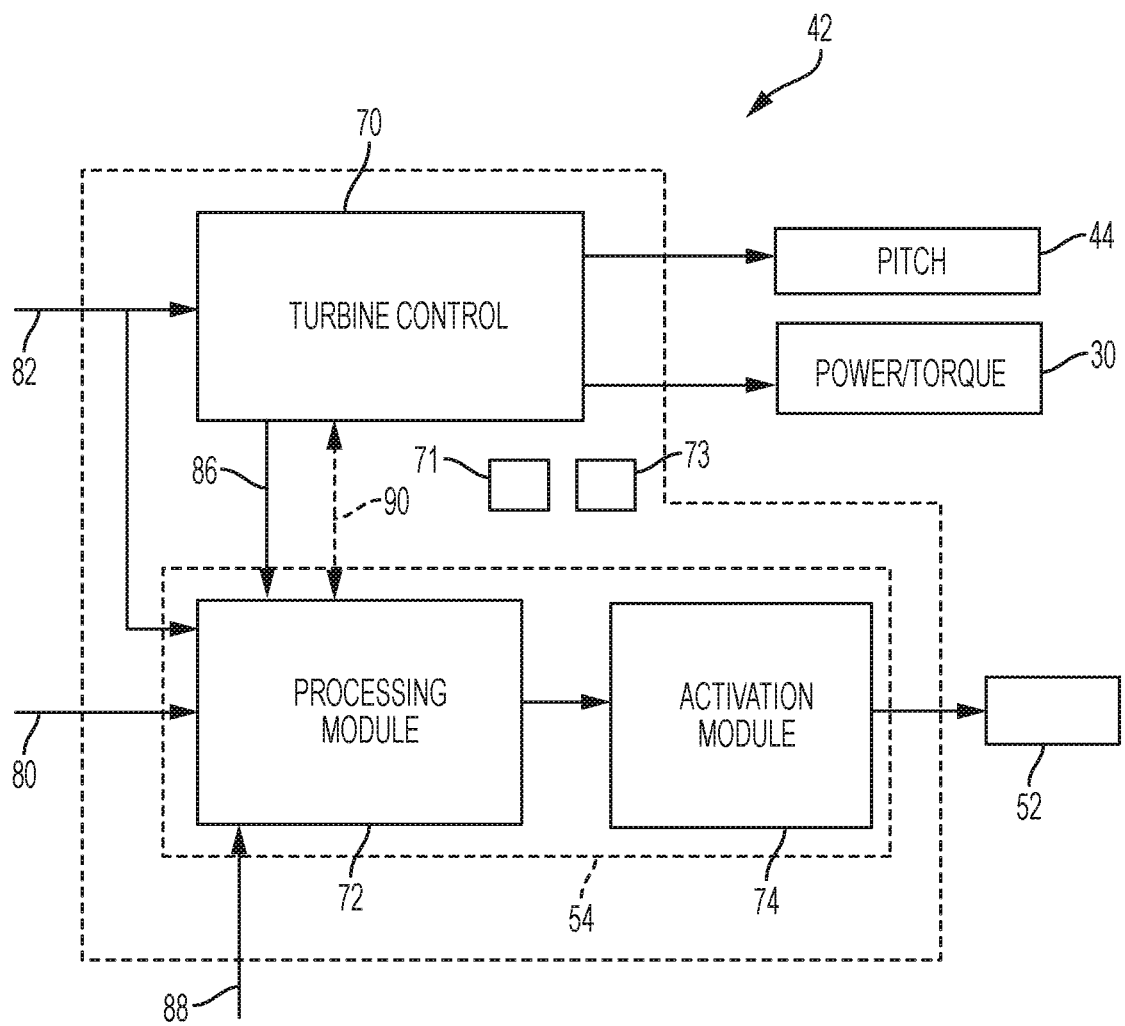
FIG. 5 is a block diagram of a system in accordance with an embodiment of the invention.

With the above in mind, the boundary layer control system will now be described in more detail. A schematic overview of the control system 42 is shown in FIG. 5. The control system 42 includes a turbine control module 70 which provides the main functionality for controlling the pitch control system 44 and the power converter 30. However, in the illustrated embodiment the boundary layer control module 54 is also implemented within the hardware/software/firmware of the control system 42. A suitable memory module 71 and input/output system 73 are also included.

The boundary layer control module 54 includes a processing module 72 and an activation module 74. In broad terms, the function of the processing module 72 is to receive certain operational parameters from the wind turbine system that are relevant to the operation of the boundary layer control system 50, to carry out processing on that data, and to output processed data to the activation module 74. The activation module 74, in turn, applies decision logic or algorithms on the received data in order to make a determination about whether the boundary layer control system 50 should be activated or deactivated.

The processing module 72 may receive a variety of operational parameters relating to the wind turbine. Those parameters may be input into the processing module 72 by dedicated signal lines but, as an alternative, the processing module 72 will receive the necessary data from a system data bus (not shown). Irrespective of how the data is received by the processing module 72, that data may include, by way of example, a tower acceleration signal 80 and a rotational speed signal 82. The tower acceleration signal 80 may be generated by a suitable accelerometer (or set of accelerometers) located at a predefined position in the tower so as to provide an accurate signal of tower motion. Naturally, that signal may be processed in order to derive speed and displacement information relating to the tower.

Typically such accelerometers are located at the top of the tower which is where the swaying motion of the tower is at its greatest. The rotational speed signal 82 provides an indication of the speed of operation of the wind turbine and so may be taken from any suitable sensor, for example a speed sensor such as Hall effect sensor mounted on the input shaft 24 or an encoder associated with the gearbox 22.

Figure 6:
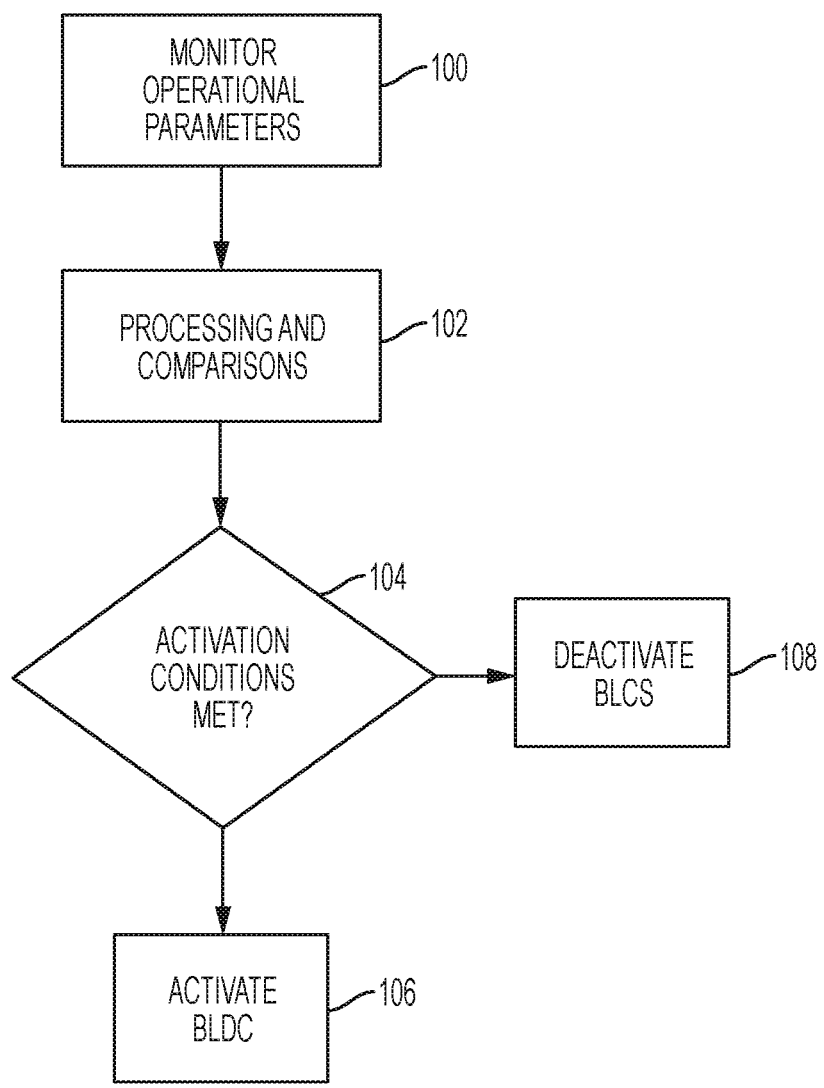
FIG. 6 is a flow chart illustrating functionality in accordance with an embodiment of the invention.

In overview, and with reference to FIG. 6, the control module 54 is operable to monitor operational parameters of the wind turbines (step 100), carry out appropriate processing and decision making logic on the monitored operational parameters (step 102), determine whether one or more predetermined activation conditions are satisfied (step 104), and to activate or deactivate the boundary layer system as appropriate (steps 106, 108).

Activation Based on Rotational Speed Threshold

The valve means 52 may be activated based on monitoring the rotational speed of the wind turbine. The processing module 72 may simply pass the rotational speed signal 82 to the activation module 74 which then analyses the signal to determine whether an activation condition is satisfied; in this example, the activation module 74 may compare the rotational speed signal 80 to a predetermined threshold that is determined as a maximum operational speed for the wind turbine. Note that the predetermined threshold may be set at a suitable value depending on the object to be achieved with the boundary layer control, for example between 105% and 120% of rated operational speed. A threshold towards the lower end of this range, or even below it, will result in a sensitive system that will trigger activation of the valve means 52 once a relative small speed rise is detected. Such an approach may be useful to avoid extreme tower loading. Conversely, a threshold set towards the upper end of this range, or even higher, would result is a less sensitive system which would only trigger the valve means 52 during extreme speed excursions beyond rated speed. This approach may be useful to avoid adverse effects such as disturbance of production, loss of power and increased pitch system fatigue.

One benefit of activating the boundary layer control system 50 is that it provides a rapid and effective way of reducing lift generated by the blades and so this means that a less aggressive pitch manoeuvre is required for the same lift reduction. In some circumstances, it may mean that the generated lift can be reduced simply by operating the boundary layer control system 50, without also applying a pitch input. This reduces the amount of pitching activity required and, over time, can reduce significantly the wear on the pitch system.

The threshold may be configurable at the time of manufacture to any desired value, and/or it may be configurable during use by way of a suitable software update for the control system 42. In order to avoid rapid activation and deactivation of the boundary layer control system 50, the activation module 74 may apply a hysteresis to the rotational speed parameter 82.

Activation Based on Tower Motion, i.e Tower Speed/Acceleration

The valve means 52 may be activated based on monitoring the motion of the tower. In this way, the boundary layer control system 50 can be used to regulate the pitch generated by the blades in order to counteract particularly the fore-aft swaying motion of the tower. This could ordinarily be achieved by using the pitch control system 44, although reducing tower motion by controlling the operation of the boundary layer control system, for example so that it is in synchronisation with the tower motion, means that the pitch control system would need to be used less, thereby reducing the wear on its various components such as pitch motors, bearings and so on.

In this example, the processing module 72 receives the raw accelerometer data in the tower acceleration signal 80 and performs suitable processing operations on that signal in order to derive a suitable data type for the activation module 74 to analyse for exceedance of suitable thresholds. For example, the processing module 72 may process the raw data to calculate the mean of the acceleration signal over a given time window on a rolling average basis, and may also calculate the standard deviation of that signal. A relatively short time window, for example between approx. 0.5 to 5 seconds is envisaged to be most appropriate which would enable the system to react to sharp changes in the tower oscillation, and may also help to avoid the system from being in operation for a prolonged period of time. In this way, the processing module 72 provides information to the activation module 74 of the magnitude of the oscillation of the tower, but also changes in that oscillation. For example, wind gusting that would result in large swaying movements of the tower would be reflected in a change in the standard deviation of the tower acceleration signal 80. The activation module 74 may therefore be configured to compare the standard deviation of the tower acceleration with one or more predetermined thresholds in order to detect relatively large excursions of the tower oscillation from what is considered to be a 'safe' or 'acceptable' level, i.e. not excessive. A parameter, such as tower motion, may be determined as excessive, when the parameter is above a certain predetermined threshold.

For the tower motion, the predetermined threshold could be one or more of a threshold for the position, speed or acceleration of a certain point of the turbine, such as a top of the tower, tower strain, tower bottom moment, etc. The parameter evaluated against the predetermined threshold could be measured, or estimated.

If the activation module 74 determines that the standard deviation of the tower acceleration signal has been exceeded, then it may activate the valve means 52 of the boundary layer control system thereby disrupting the flow of air over the blade and reducing the generated lift. This will have the effect of reducing the thrust input on the nacelle, thereby reducing the oscillatory motion of the tower.

Other statistical processing techniques could be used. For example, the processing module 72 may implement a sequential change detection algorithm such as 'CUSUM' or 'cumulative sum', which may provide a more robust metric for the value of change in the tower acceleration system which would mean that a more reliable decision could be taken to activate and deactivate the boundary layer control system 50.

In general, it is envisaged that the boundary layer system should only be activated for a relatively short period of time in order to avoid the wind turbine control system 52 from taking measures to counteract its affect, for example by reducing pitch in order to increase thrust. Thus, the boundary layer control module 54 may be configured to implement a maximum activation time limit to ensure that the boundary layer control system is not activated for greater than a predetermined time period, for example between 3 and 30 seconds, or between 5 and 10 seconds.

Activation Based on Rotational Speed Threshold and Tower Speed/Acceleration

In the examples described above, the control module 54 determines whether to activate the boundary layer control system 50 in dependence either on the rotational speed of the wind turbine, or in dependence on the tower motion.

In an embodiment of the invention, however, the control module 54 is operable to activate and deactivate the boundary layer control system 50 based on a combination of the rotational speed of the wind turbine and the tower motion. Since the control module 54 would monitor and assess two parameters (e.g. rotational speed and tower acceleration) against predetermined thresholds, this approach may provide the benefit that the boundary layer control system would less likely to be activated inadvertently.

This approach also provides more flexibility in determining certain operational conditions in which it could be useful to activate the boundary layer control system. For example, it may be determined how the tower is oscillating, whereby the boundary layer control system can be activated and deactivated in order to counteract that fore-aft movement of the tower. In this approach, the processing module 72 may be configured to interrogate the tower acceleration signal 80 and provide information to the activation module 74 about whether the tower is moving forward or moving backwards within an oscillatory cycle. Taking this into account, the activation module 74 may then factor in the rotational speed signal 82 and control the activation/deactivation of the boundary layer control system accordingly by applying different speed thresholds depending on the direction of tower movement.

For example, if the tower is judged to be moving forward, then a lower speed threshold may be set compared to if the tower is moving backwards. To explain further, if the tower is moving forwards, then it is desirable to maintain a high thrust to counteract that movement, whilst also reducing rotor speed (due to a reduction on rotor torque), and so a lower speed threshold would mean that the boundary layer control system would be activated at lower overspeed values which has the effect of reducing the rotational speed, whilst preserving thrust. Conversely, when the tower is moving backwards, then it is desirable to reduce thrust so a higher threshold would mean that the boundary layer control system 50 would be activated only at higher speeds, or not at all. Taken together, these measures will have the effect of reducing the thrust inputs to the tower, thereby reducing the magnitude of tower oscillation. In this discussion it should be appreciated that the terms 'forward' and 'backwards' are to be understood in the context of the nacelle, such that the 'forward' direction means that the nacelle is moving in line with the rotor axis in the direction in which the nose cone of the hub points. The 'backwards' or 'rearwards' direction is to be interpreted in the opposite sense.

Activation Based on a Turbine Shutdown Event

In another example, the control module 54 may be operable to activate the boundary layer control system 50 if it detects that suitable shutdown conditions exist. In such circumstances, the valve means 52 may be activated to reduce the lift on the blade, possibly in addition to pitch control of the blades to a feathered position, in order to slow the rotor to a safe speed.

In order to determine whether suitable shutdown conditions exist, the control module may be responsive to a dedicated shutdown signal 86, which is shown in FIG. 5 as being received from the turbine control module 70. That signal 86 may represent the current operational state of the wind turbine and so can be interrogated to determine whether it is a shutdown state. Note that the shutdown signal 86 could be input to the control module 54 from another source. Alternatively, or in addition, the control module 54 may be configured to monitor other data sources that may be used to identify a shutdown event; for example, the control module 54 may monitor the voltage on the grid, or power reference values received from a power plant management system (not shown). The system could also monitor internal power and, if that fails, the control module 54 would be operable under backup power to activate the boundary layer control system 50 as a fail safe.

Activation Based on Excessive Blade Loads

In another example, the control module 54 may be configured to receive one or more data signals 88 relating to the loading on the blades. For example, such data may be derived from strain gauge data which provides a measure of the bending moment at the root of the blade, or laser-based systems configured to measure the deflection of various points in the blade. Other sources of blade load data are available and would be understood by the skilled person.

The blade related data 88 may be received by the processing module 72 and processed into a suitable format for use by the activation module 74. In turn, the activation module 74 may make a decision about whether to activate or deactivate the boundary layer control system 50 based on that data 88. In general terms, if the data 88 indicates that blade flap loads are excessive so as to exceed a predetermined threshold, then the boundary layer control system 50 may be activated to reduce the blade loads. Similar activation may be controlled based on the identification on edgewise blade oscillation. Suitably, statistical processing may be performed on the blade load signals in order to provide a robust technique to assess the magnitude of the blade loading and how the loading is changing over time.

Although the control may be carried out simultaneously across all three blades of the wind turbines, the activation module 74 may be configured to provide discrimination to the blade data 88 in order to activate the valve means 52 selectively and individually for each blade.

The skilled person will appreciate that the specific embodiments described above may be adapted without departing from the general inventive concept, as defined by the claims.

In the above discussion, the turbine control module 70 and the boundary layer control module 54 are presented as operating as parallel systems or functionalities with minimal or no interaction. However, it is envisaged that this need not be the case and that the boundary layer control module 54 may communicate with the turbine control module 70 so that the turbine control module 70 may adjust its operational parameters based on whether the boundary layer control system 50 is activated or deactivated. This communication path is represented by the dashed line '90'. As an example of when such communication would be beneficial, the turbine control module 70 may be configured to adjust controller characteristics, (e.g. controller gains) within an internal pitch controller, speed controller, or damping controller, if the boundary layer control system is activated. This will guard against said controllers attempting to compensate for the effects of the boundary layer control system by increasing their respective control inputs.

The invention claimed is:

1. A wind turbine system comprising:
 a nacelle mounted on a tower;
 a rotor having a plurality of blades and a boundary layer control system configured to control airflow through blade surface openings in each of the blades; and
 a control system configured to:
  monitor an operational speed parameter and a tower motion,
  determine a direction of the tower motion, and activate the boundary layer control system upon determining that the operational speed parameter exceeds an operational speed parameter threshold and the tower motion exceeds a tower motion threshold, wherein the operational speed parameter threshold is varied based on the direction of the tower motion.

2. The wind turbine system of claim 1, wherein the operational speed parameter threshold is, prior to being varied based on the direction of the tower motion, set at a value between 105% to 120% of a rated operational speed of the rotor.

3. The wind turbine system of claim 1, wherein the operational speed parameter threshold is increased if the control system determines that the direction of the tower motion is in a rearwards direction.

4. The wind turbine system of claim 1, wherein the operational speed parameter threshold is reduced if the control system determines that the direction of the tower motion is in a forward direction.

5. A method of operating a wind turbine, the wind turbine including a nacelle mounted on a tower, a rotor having a plurality of blades and a boundary layer control system configured to control airflow through blade surface openings in each of the blades, wherein the method comprises:
monitoring an operational speed parameter;
monitoring a tower motion based on a statistical processing of a signal indicating tower acceleration; and
activating the boundary layer control system upon determining that the operational speed parameter exceeds an operational speed parameter threshold and the tower motion exceeds a tower motion threshold.

6. A computer program product downloadable from a communication network or stored on a machine readable medium, comprising program code instructions which, when executed by one or more processors, performs an operation, comprising:
monitoring an operational speed parameter, a tower motion, and a signal indicating a blade load;
applying a statistical process to determine a standard deviation of the signal indicating the blade load; and
activating a boundary layer control system upon determining that the operational speed parameter exceeds an operational speed parameter threshold, the tower motion exceeds a tower motion threshold, and the standard deviation of the signal indicating the blade load exceeds a blade load threshold.

7. A controller for a wind turbine system including a nacelle mounted on a tower, a rotor having a plurality of blades and a boundary layer control system configured to control airflow through blade surface openings in each of the blades, wherein the controller comprises a memory module that includes a set of program code instructions which when executed by a processor, implement an operation comprising:
monitoring an operational speed parameter, a tower motion, and a blade flap load, and
activating the boundary layer control system upon determining that the operational speed parameter exceeds an operational speed parameter threshold, the tower motion exceeds a tower motion threshold, and the blade flap load exceeds a blade load threshold.

8. The method of claim 5, wherein determining the tower motion comprises calculating a standard deviation of the signal, and
wherein determining that the tower motion exceeds the tower motion threshold comprises comparing the calculated standard deviation of the signal to the tower motion threshold.

* * * * *